United States Patent [19]

Jacobs et al.

[11] Patent Number: 5,693,954
[45] Date of Patent: Dec. 2, 1997

[54] VERIFICATION OF THE PERFORMANCE OF PHOTOSTIMULABLE PHOSPHOR READ OUT SYSTEM

[75] Inventors: Walter Jacobs, Blaasveld; Pieter Vuylsteke, Mortsel, both of Belgium

[73] Assignee: Agfa-Gevaert, Mortsel, Belgium

[21] Appl. No.: 547,625

[22] Filed: Oct. 24, 1995

[30] Foreign Application Priority Data

Oct. 27, 1994 [EP] European Pat. Off. ............. 94203126

[51] Int. Cl.$^6$ .............................. G01T 1/29; G03B 42/02
[52] U.S. Cl. .......................... 250/581; 250/582; 250/584
[58] Field of Search ..................... 250/252.1 A, 252.1 R, 250/580, 581, 582, 583, 584, 585, 586, 587; 378/207

[56] References Cited

U.S. PATENT DOCUMENTS 5,420,441   5/1995   Newman et al. ........................ 250/581

Primary Examiner—Carolyn E. Fields
Assistant Examiner—Edward J. Glick
Attorney, Agent, or Firm—Richard J. Birch

[57] ABSTRACT

A radiographic image read out system having on-line performance verification. A number of parameters to be used in a test program are stored together with (a) limiting value(s) for (a) characteristic value(s) resulting from application of the test program. An image signal of a phantom is processed according to the test program to determine at least one characteristic value. At least one limiting value for each determined characteristic value is retrieved from storage and a hard copy of the image of the phantom along with the at least one characteristic value in relation to the limiting value(s) is produced.

8 Claims, 3 Drawing Sheets

VERIFICATION OF THE PERFORMANCE OF PHOTOSTIMULABLE PHOSPHOR READ OUT SYSTEM

FIELD OF THE INVENTION

The present invention relates to quality assurance performed in the field of digital radiography.

The invention more specifically relates to the verification of the performance of a system for reading a radiation image stored in a photostimulable phosphor screen.

DESCRIPTION OF THE PRIOR ART

In the field of digital radiography a wide variety of image acquisition techniques have been developed that render a digital representation of a radiation image.

In one of these techniques a radiation image, for example an x-ray image of an object, is stored in a screen comprising a photostimulable phosphor such as one of the phosphors described in European patent application 503 702 published on Sep. 16, 1992.

In a read out station the stored radiation image is read by scanning the screen with stimulating radiation such as laser light of the appropriate wavelength, detecting the light emitted upon stimulation and converting the emitted light into a digital signal representation.

After read-out the residual image left on the photostimulable phosphor screen is erased so that the screen is again available for exposure.

Since the image is available in a digital form, it can be subjected to various kinds of digital image processing techniques for the purpose of enhancing the image quality.

The original or enhanced image can then be transmitted to a hard copy recorder for reproduction of the image on the film size and lay-out of the radiologist's choice and/or it can be applied to a monitor for display.

The advantage of digital radiography resides i.a. in the fact that the image quality can be enhanced by processing the digital image representation.

However, all efforts put into image enhancement and optimization are limited in value when there is no assurance that the performance of the applied image acquisition technique is reliable and that occasional fluctuations of the set up of the read out system remain between acceptable limits.

Therefore there is a need for regular verification and monitoring of various aspects of the performance of the read out apparatus.

This issue has already been addressed in the state of the art disclosures that are mentioned hereafter.

In the article "Photostimulable Phosphor, System Acceptance Testing" disclosed in the proceedings of the summer school 1991 held at the University of California, Santa Cruz between Jul. 15 and Jul. 19, 1991 some test procedures for read out apparatus of the above named kind are described.

Further the article "Optimization and quality control of computed radiography" by C. E. Willis et al.; displayed at the Radiological Society of North America 1993 Annual Meeting relates to quality assurance procedures for computed radiography systems.

In a workshop on "Test phantoms and optimisation in diagnostic radiology and Nuclear medicine" held in Würzburg, Germany on Jun. 15–17, 1992 an embodiment of a test object and a test procedure has been presented by Agfa-Gevaert. The disclosed test procedure is performed by manual measurement on an image of a measurement phantom or by off-line evaluation of the results of a test procedure performed on the image of a test object.

Generally verification of system parameters of a photostimulable phosphor read out system of the above-named kind is performed by evaluating the x-ray image of a so-called measurement phantom.

Such a test-phantom commonly consists of an x-ray transparent substrate into which x-ray opaque items are embedded that make an evaluation of the performance of the system possible.

Phantoms exist and can be produced that are suitable for verification of a number of parameters.

Examples are a phantom for verifying geometric characteristics of the read out system such as scanned width, begin and end position of scan line, a phantom for verifying frequency response of such a system, a phantom for verifying contrast etc.

For the purpose of verification of the system characteristics, a combination of a photostimulable phosphor screen (for example of a size between 13 and 43.2 cm) and such a measurement phantom is exposed to x-rays.

The exposed photostimulable phosphor screen is scanned by means of stimulating irradiation and the light emitted upon stimulation is detected and converted into an electric signal representation.

This signal representation is then applied to a laser recorder for generating a hard copy of the image of the phantom.

Then, several parameters are determined on this hard copy image and are compared with corresponding limiting values (i.e. extreme value that is acceptable).

The prior art methods have the following disadvantages.

In case measurements are performed on the hard copy reproduction of an image of a phantom, occasional inaccuracy of the reproduction device might have an influence on the determined values of device characteristics.

Further, errors might be introduced when performing measurements on the hard copy image of the phantom.

Still further, the hard copy of the image of the phantom might get lost so that the reproduction must once more be produced or in the worst case the exposure of the phantom must even be repeated.

In case the digital representation of an image of the phantom is down-loaded to a service PC instead of, or in addition to applying this digital representation to a hard copy recorder, the system parameters can be determined by means of that service PC when it is loaded with suitable measurement software.

However, such a procedure in most cases demands for intervention of a service technician and is commonly not performed by the user of the system on a regular basis.

Both systems are disadvantageous in that, unless the user of the read out system collects the hard copy images of the phantom produced at regular intervals, there is no record kept of the history of the performance of the read out system.

Further, there is no uniformisation of the interpretation of the system's characteristics.

OBJECTS OF THE INVENTION

It is an object of the present invention to enable evaluation of the operation of an apparatus for reading a radiographic image stored in a photostimulable phosphor screen.

It is a further object to provide a system that automatically provides such evaluation without requiring any intervention.

It is still a further object to provide such a system by which the shortcomings of the prior art solution, i.a. namely the inaccuracy of measurements and the lack of uniform interpretation, is avoided.

STATEMENT OF THE INVENTION

In accordance with the present invention the above objects are achieved by providing a radiographic image read out system comprising means for scanning a photostimulable phosphor screen wherein a radiation image has been stored with stimulating radiation, means for detecting light emitted upon stimulation, means for converting emitted light into an electric signal representation of said image, storage means storing a number of parameters to be used in a test program and storing (a) limiting value(s) for a characteristic value(s) resulting from application of said test program, means for processing a signal representation of an image of a measurement phantom according to said test program so as to determine by means of said parameters at least one characteristic value representative of the performance of the read out system, means for generating a hard copy comprising said phantom image, a representation of said characteristic value(s) in relation to the corresponding limiting value(s).

The system is advantageous in that it provides at least one value indicative of its performance by on-line processing of an image of a measurement phantom and by situating that value relative to a corresponding limiting value; whereas in prior art systems an image of a measurement phantom was generated without any interpretation having been performed on said image. It was then the task of the operator or the service technician either to make a hard copy of said image and to perform measurements on the hard copy and to evaluate the measured values in the light of corresponding limiting values or alternatively, to down-load the data pertaining to the image of the measurement phantom to a service personal computer and to evaluate then the down-loaded data on the service PC (also in the light of corresponding limiting values).

In a preferred embodiment an identification station is added to the system. Upon selection, of a test program a key indicative of said test program is written into a means identifying a photostimulable phosphor screen. The read out apparatus is then provided with means for reading the key and for processing of an image read out of a phosphor screen to which said key has been associated according to said test program.

It is most convenient to use an electronic identification device such as an electronic memory device, e.g. an electrically erasable programmable read only memory, provided on a cassette conveying a photostimulable phosphor screen.

Such a cassette has been described in extenso in EP 307 760. This embodiment is advantageous because the information in the EEPROM can be erased so as to be re-usable and/or it can be updated so that it can for example comprise a number that indicates the number of times a cassette has been exposed.

Other identification means such as a one dimensional bar code are also possible.

It is also advantageous to provide the read out apparatus with means for storing the determined characteristics so that at any point in time a history of the performance of the machine can be retrieved.

In this way no hard copy of the results of quality assurance tests performed on the machine need to be kept with the machine and any possible loss of results of an evaluation of the operation of the read out apparatus is excluded.

Another aspect of this invention relates to a method of verifying the performance of a photostimulable phosphor read out system comprising the steps of (i) exposing to x-rays a photostimulable phosphor screen on top of which a measurement phantom is positioned, (ii) scanning by means of stimulating irradiation at least a part of the exposed screen comprising an image of said phantom, (iii) detecting light emitted upon stimulation and converting detected light into electric signal values representing an image of said phantom, (iv) subjecting the electric signal values representing an image of said phantom to on-line processing according to a test program using parameters that have been stored in advance so as to determine at least one characteristic value indicative of the performance of the read out system, (v) retrieving from a memory device limiting value(s) corresponding with said characteristic value(s), (vi) applying signal values pertaining to an image of said phantom, said limiting value(s) and said performance characteristic value(s) to a recorder to generate a hard copy image of said phantom and a representation of said characteristic value(s) in relation to said limiting value(s).

Additionally, at least said characteristic value(s) is stored on-line, i.e. for example on the system disc of the read out system.

In a preferred embodiment of this method the test program is initiated upon reading a key referring to a test program. Preferably said key is stored in an identification means of the phosphor. Preferably the key is written into an electronic memory device such as an EEPROM, on the cassette conveying the photostimulable phosphor screen.

Dedicated measurement phantoms can be produced for evaluation of several kinds of characteristics of the operation and behaviour of a system for reading a radiation image stored in a photostimulable phosphor screen.

Examples of these phantoms are described in a co-pending European patent application EP 710 013 entitled "Method for quantitative verification of scanning geometry in digital radiographic read out system" and in a co-pending European patent application EP 710 014 entitled "Method for verification of the frequency response of a digital radiographic read out system".

The phantoms commonly comprise an x-ray transparent substrate wherein x-ray opaque means are embedded. These x-ray opaque means are constructed so as to be adequate for specific measurement purposes.

For example, for verifying geometric scanning characteristics these x-ray opaque means are at least one x-ray opaque ruler consisting of a number of equidistant lead strips.

In another example used for verifying the frequency response of a radiation read out system, the phantom consists of an x-ray transparent substrate wherein at least one X-ray opaque grating is embedded comprising line patterns of predetermined orientation and stepwise evolving spatial frequency.

Other examples of measurement phantoms dedicated for other kinds of measurements might be envisioned.

To enable verification of system characteristics, such a phantom is positioned on top of a photostimulable phosphor screen (of any size) in a fixed position. Then the phantom-screen combination is exposed to x-rays.

Next, the image is read out of the exposed screen and the image of the phantom is evaluated. In accordance with this invention this evaluation is performed on-line in processing means part of the read out apparatus under control of a test program that calculates by means of signal values representing the image of the phantom and by means of parameters required for execution of the test program that are retrieved from a storage means (e.g. the system disc) in the read out apparatus.

BRIEF DESCRIPTION OF THE DRAWINGS

Particular aspects of the present invention as well as preferred embodiments thereof will be illustrated by means of the following drawings in which.

DETAILED DESCRIPTION

The system of the present invention and the operation of this system will be explained hereafter with reference to an example in which the geometric characteristics of a read out system for photostimulable phosphor screens are evaluated.

The geometric characteristics of a system for line-wise scanning a photostimulable phosphor screen are verified on an image of a so-called measurement phantom.

A dedicated measurement phantom for verifying geometric characteristics consists of a flat rectangular substrate of a material that is transparent to x-rays. In this substrate a ruler is embedded. The ruler consists of multiple thin strips of a material that can attenuate x-rays, such as a metal, for example lead or aluminum. The strips are typically 20 mm long and 1 mm wide. They are parallel to each other and are equidistantly spaced along the whole ruler length. The spacing between individual strips is 5 mm. The ruler covers the entire width of the phantom, i.e. about 36 cm so as to accommodate for the full scanning width. The ruler is embedded in the phantom substrate parallel to one of the sides of the phantom.

Figure 1:
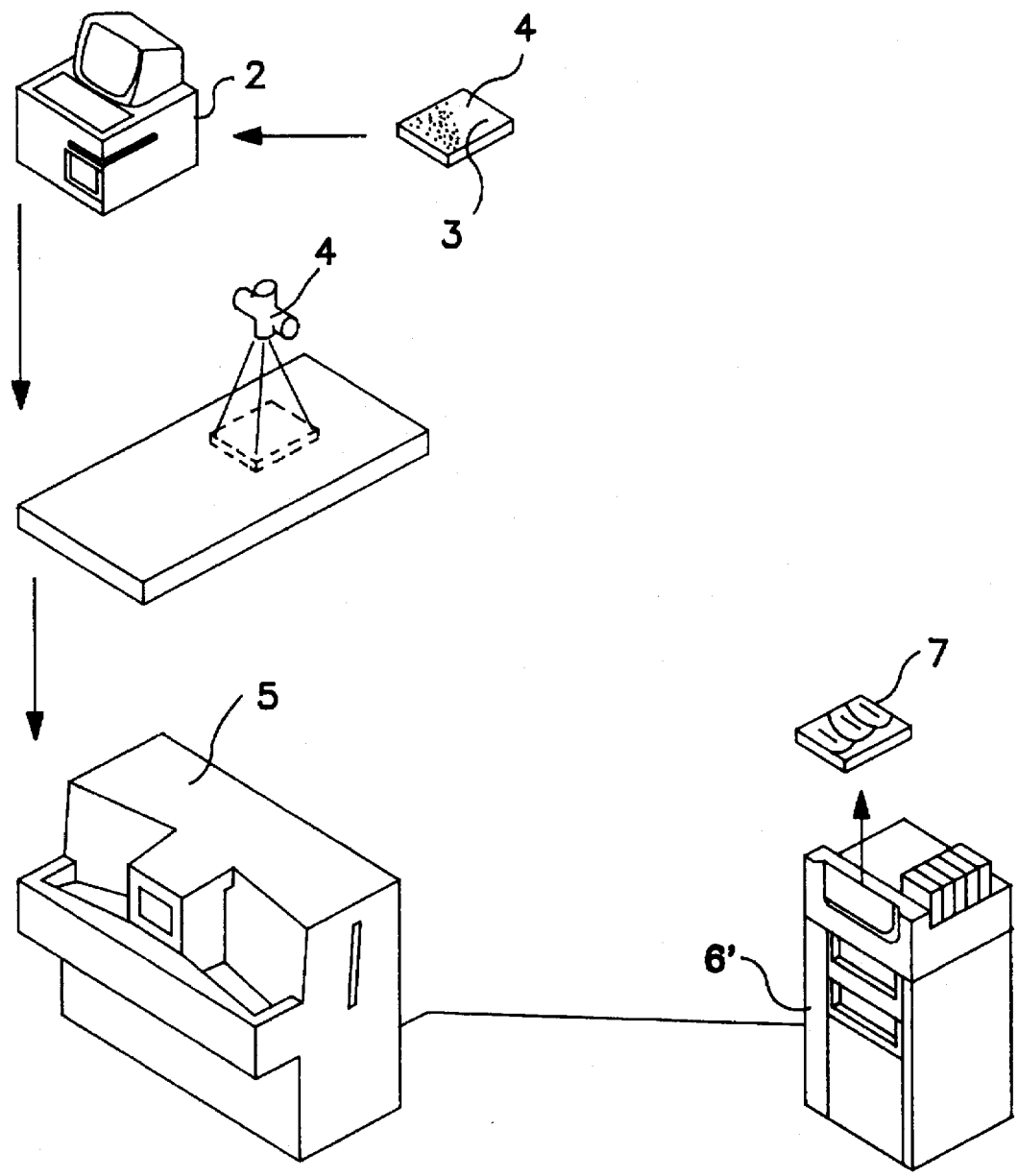
FIG. 1 is a general view of a digital radiography system in which a radiographic system is stored in a photostimulable phosphor screen.

The test program starts by identifying a cassette conveying a photostimulable phosphor screen, indicated by numeral 1 in FIG. 1, in an identification station 2.

The cassette is provided with an electrically erasable programmable read only memory 3 (EEPROM). In the identification station various kinds of data such as data relating to the read out conditions and/or data relating to the signal processing that is to be applied and/or to the destination of an image after read-out can be written into the EEPROM.

The cassette is fed into the identification station and from a number of available processing programs that are displayed on the monitor of the identification station, a test program is selected. Then a key indicative of this program item is written onto the EEPROM.

Next an exposure step is performed. For this purpose, the measurement phantom is positioned on top of a cassette conveying an unexposed photostimulable phosphor screen in such a way that the ruler strips are perpendicular to the direction of line-wise scanning (fast scanning direction), The correct position of the phantom is obtained by means of markers that serve to align the phantom with the cassette conveying the photostimulable phosphor screen.

The combination of photostimulable phosphor screen and phantom on top of the screen is then exposed to x-rays emitted by an x-ray source 4 under normal exposure conditions.

The exposed photostimulable phosphor screen is then fed into a read-out apparatus 5 for reading the radiation image of the phantom.

Figure 2:
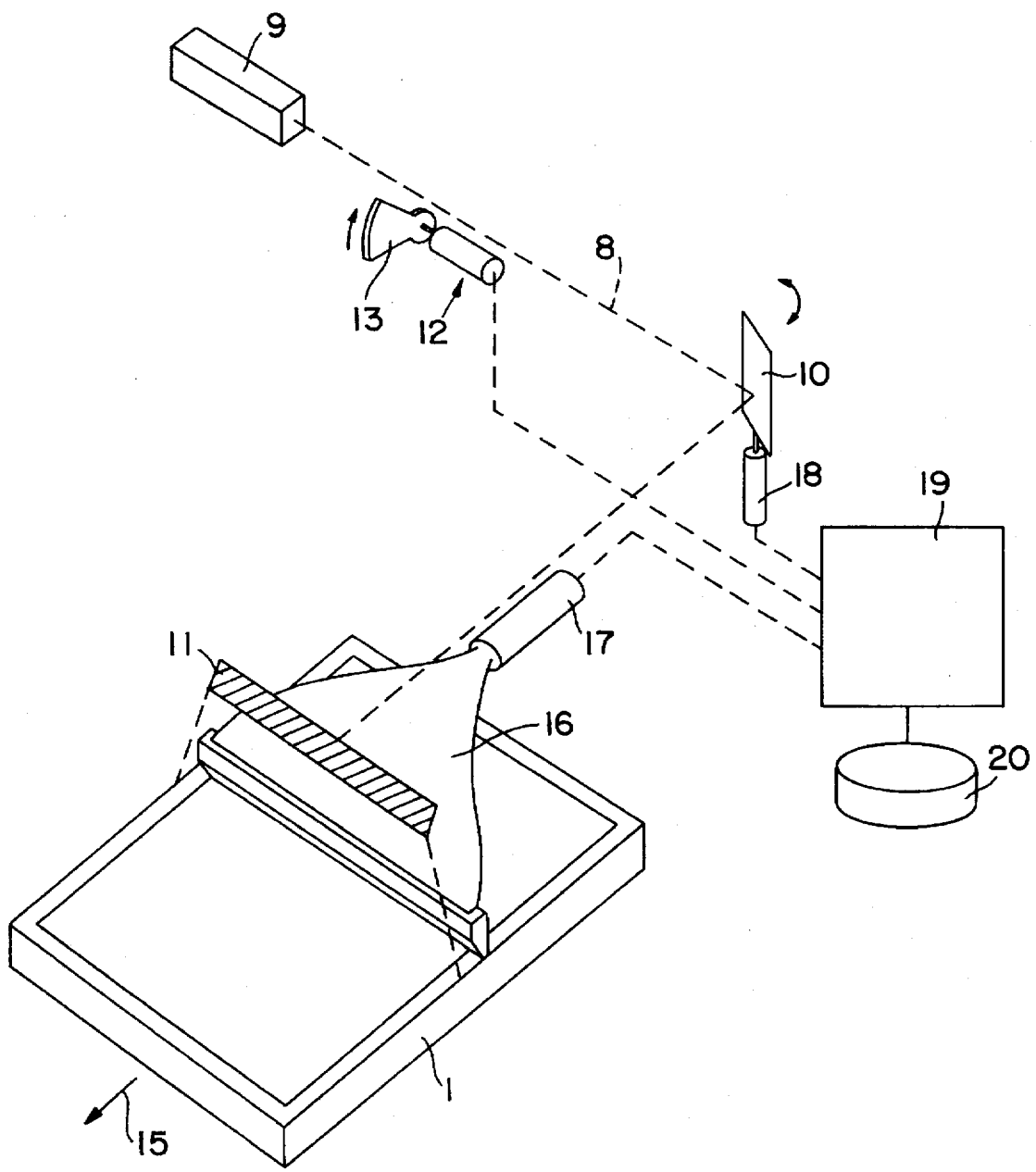
FIG. 2 is a detailed view of a system for reading an image stored in a photostimulable phosphor screen.
Figure 3:
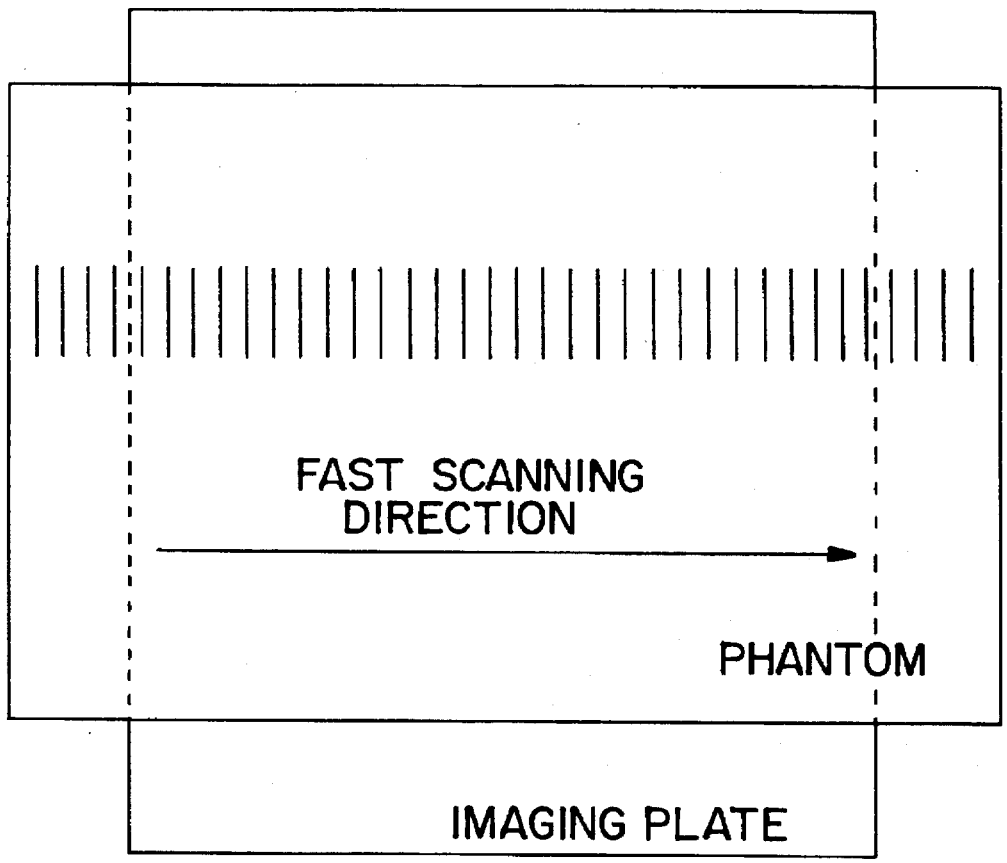
FIG. 3 is an example of a measurement phantom positioned on top of a screen.

A simplified diagram illustrating the operation of the read-out apparatus is shown in FIG. 2.

Read-out of an image stored in a photostimulable phosphor screen is performed by scanning the screen by means of a stimulating light beam 8 emitted by a light source 9 emitting light of a wavelength within the stimulating wavelength range of the phosphor used. For example a HeNe laser emitting at 633 nm is used.

A fast scan movement is obtained by directing the light beam emitted by a laser towards an oscillating scan mirror 10 that is driven by a galvanometer. General computer 19 and drive means 18 control the galvanometer movement under control of a triangular wave pattern.

A light chopper 12 with a rotating disc segment 13 is positioned in the laser beam path during the galvanometer retrace step.

Various laser beam focusing devices such as an F-thèta lens, can be used to ensure a uniform beam diameter during scanning of the beam on the phosphor sheet and also ensure that the uniform angular velocity of the reciprocating mirror results in the laser spot travelling across the phosphor sheet at a uniform linear speed.

The laser beam is one-dimensionally deflected in a line direction by the galvanometer mirror 10 and a plane reflection mirror 11. The movement of the laser beam in the line direction is commonly referred to as fast scan movement, The slow scan movement, i.e. the movement in a direction perpendicular to the fast scan movement, is provided by means of transport means that transport the screen at a uniform speed of in a direction perpendicular to the main scan direction to enable the whole sheet to be scanned in a uniform manner (direction of arrow 15).

Positioned close to, but behind the scanning line of the laser beam on the phosphor sheet, is a light guide 16 that receives light emitted from the phosphor sheet but is shielded from direct exposure to the laser beam. The output end of the light guide is positioned adjacent a photo-detector 17, which produces an electrical signal dependent upon the light intensity falling there on. Suitable electrical connections are made to pass the output signal from the photo-detector to a computer 19. This computer serves to control the light chopper 12 and the galvanometer mirror drive 18.

A sample and hold circuit and an analog-to-digital converter (not shown) are provided to convert the electric signal into a digital image signal.

The digital image signal is then fed to general computer 19 wherein image processing is performed. The general computer is also connected to the system storage disc 20.

The operation of the radiation image read-out apparatus is as follows.

First the information stored in the EEPROM is read. In this way a test program is identified so that the image that will be read out is identified as a phantom image and will be processed according to a dedicated test-program by the processing unit of the read out device. Parameters to be used during execution of this dedicated test program were previously stored in the system disc. They are now identified by the key and retrieved from the system disc.

These parameters are used for determining values that are characteristic for the geometric properties of the read out device.

After identification of the screen and the associated processing menu (this is the test procedure), the scanning operation of the read out apparatus is started.

The exposed screen is scanned by means of laser light of the appropriate stimulating wavelength and the image emitted upon stimulation is detected and converted into a digital image representation.

The next is step is the analysis of the digital image of the measurement phantom so as to determine values for specific geometric parameters. Geometric parameters are more specifically determined by evaluation of the image of the ruler(s). For this purpose the signal values pertaining to the ruler(s) are to be selected. Hence the position of the ruler(s) is to be known.

Since the phantom is aligned with respect to the image screen for each cassette format, the image of the ruler will be located at a fixed position within the image on the exposed screen up to some uncertainty, caused by some unavoidable inaccuracy of alignment.

An image row index $j_r$, corresponding to the approximate position of the ruler center line for the actual cassette format, was stored in advance as one of the parameters that pertains to a test program.

Upon reading an identifier associated with a measurement procedure from the EEPROM on the cassette conveying the photostimulable phosphor screen, the row index is fetched from a system data table. This table is permanently stored in the file system of the image read out device, and it contains all fixed system parameters, including those describing the phantom geometry.

In a first step of the method for determining the geometric characteristics the digital image data pertaining to 2K+1 consecutive rows of the image are taken into account. These data are vertically averaged (i.e. data pertaining to the same column in each of these 2K+1 lines of the matrix of read out pixels are averaged) to reduce the effect of image noise. The following formula is applied to obtain average intensity values across the selected rows:

$$m_i = \frac{1}{2K+1} \sum_{j=j_r-K}^{j_r+K} g_{i,j}$$

where the horizontal coordinate i ranges from 0 through M−1. M is the number of pixels in each image row. The value of K is such that a band of 2K+1 pixels high, centered around the row with vertical coordinate $j_r$, is about half as wide as the imaged height of the ruler strips. This way it is assured that the image band within which averaging is applied, lies entirely within the ruler image, despite small phantom misalignment errors. The parameter K is fetched from the system data table. $g_{i,j}$ are original image values, and m is an array representing average ruler intensity values $m_i$ across the image of the ruler.

Next the horizontal coordinates $i_s$ of the ruler strips are computed. At the position of the strips the average signal value $m_i$ is lower than between the strips. All segments of consecutive values of $m_i$ are considered that are below a threshold $m_T$. The bounds of each of those segments are denoted by $a_s$ and $b_s$ respectively.

The threshold value $m_T$ is computed as the average of the minimum and maximum of the values within the array of values $m_i$. The centroid position of each segment is then computed as:

$$c_s = \frac{\sum_{i=a_s}^{b_s} i(m_T - m_i)}{\sum_{i=a_s}^{b_s} (m_T - m_i)}$$

The strip centroid coordinates $i_s$ are stored on the system disc as an array, indexed from O through S. A maximum of 71 strip locations will be found when a 35 cm wide image screen was used.

Other techniques could be used to estimate the location of the ruler strips, but the centroid computation has the advantages of being quite unsensitive to noise and being precise as long as the intensity profile across the strip is symmetric, which is the case with the kind of ruler used.

The average distance between subsequent imaged strips:

$$\Delta c = \frac{1}{S} (c_s - c_o)$$

is used for computing the average pixel sampling distance:

$$\Delta x = p_{nom}/\Delta c$$

where $p_{nom}$ is nominal ruler pitch in mm, which is a phantom constant fetched from the system data table stored on the system disc. The average pixel sampling distance $\Delta x$, expressed in mm, is used to convert the measured distances (in pixel units or fractions thereof) into metric distances (mm).

Finally the so-called geometric distortion factor is computed as:

$$dx_s = \Delta x (c_s - c_{[S/2]}) - (S - [S/2]) \Delta c)$$

where [S/2] represents the truncated half of S, i.e. the index of the ruler strip at the center of the image.

If the image samples on a line were perfectly equidistant then geometric distortion factors of zero will be found along the whole scanning line. In practice however small deviations in scanning linearity will cause minor fluctuations in sampling distance. The computed geometric distortion factors $dx_s$ at the strip with index s indicates the difference in mm between the actual strip position and the position computed from its horizontal coordinate in the image, assuming a constant pixel sampling distance equal to $\Delta x$.

The total scanned width X is also computed according to:

$$X = M \Delta x$$

Then, a measurement report is created by controlling a reproduction device, in this example a laser recorder, to make a hard copy of the image of the phantom that is completed with the following data: the array of geometric distortion factors, the peak-to-peak geometric distortion factor, the average sampling distance, the total scanned width, and the limiting levels for these quantities.

The peak-to-peak geometric distortion factor is the difference between the most extreme positive and negative geometric distortion factors.

In addition the following identification data are listed: session identification number, measurement date, readout system serial number, software version, phantom type and serial number. The session identification number is incremented each time an image screen is read out.

All this information is presented on a hard copy comprising also the image of the phantom.

For the purpose of generating this hard copy, the digital signal representation of the image of the phantom is transmitted to a recorder 6 for reproducing the image on film 7. The determined characteristic values are also sent to a recorder.

The geometric distortion factor is plotted as a graph. The other parameters are presented in textual form.

The image with the superimposed results can also be displayed on a CRT monitor.

For each analyzed phantom image a report file is created which contains all the above data.

These report files are also stored on the system hard disk of the readout system. In the course of a service intervention the service technician can make a copy of these files onto a portable personal computer for archival in an electronic database. This way a historical overview of the status of individual machines can be maintained at the service department. Also statistics can be gathered concerning the accuracy of all installed machines.

The parameters that are determined are compared with predetermined limiting levels. The results of these comparisons are interpreted and serve to guide a technician when adjusting components of the scanning system.

For example, deviations of the average sampling distance from the corresponding limiting value(s) can be undone by adjusting the oscillating movement of the mirror used for deviating a laser beam along a scanning line.

If the scanned width deviates from the corresponding limiting value, the zero position of the galvanometer movement or the path of the saw-tooth curve controlling the galvanometer movement can be adjusted. Alternatively the begin and end position of a line in an image can be adapted.

If the geometric distortion value deviates from a preset limiting value, the slow scan movement can be adjusted.

We claim:

1. A radiographic image read out system comprising:
   means for scanning a photostimulable phosphor screen wherein a radiation image has been stored with stimulating radiation,
   means for detecting light emitted upon stimulation,
   means for converting emitted light into an electric signal representation of said image,
   storage means storing a number of parameters to be used in a test program and storing (a) corresponding limiting value(s) for (a) characteristic value(s) resulting from application of said test program,
   means for processing a signal representation of an image of a measurement phantom according to said test program so as determine by means of said parameters at least one characteristic value representative of the performance of the read out system,
   means for generating a hard copy comprising said phantom image, a representation of said characteristic value(s) in relation to corresponding limiting value(s) retrieved from said storage means.

2. A system according to claim 1 additionally provided with
   an identification station comprising means for selecting a test program and means for writing upon selection of said test program, a key indicative of said test program into a means identifying a photostimulable phosphor screen;
   wherein said read out system is provided with means for controlling the processing of an image read out of a phosphor screen to which said key has been associated according to said test program.

3. A system according to claim 2 wherein said means for identifying a photostimulable phosphor screen is an electronic identification device.

4. A system according to claim 3 wherein said electronic identification device is a read only memory provided on a cassette conveying a photostimulable phosphor screen.

5. A system according to claim 1 wherein said read out system is provided with means for storing said characteristic value(s).

6. A method of verifying the performance of a photostimulable phosphor read out system comprising the steps of:
   (i) exposing to x-rays a photostimulable phosphor screen on top of which a measurement phantom is positioned,
   (ii) scanning by means of stimulating irradiation at least a part of the exposed screen comprising an image of said phantom,
   (iii) detecting light emitted upon stimulation and converting detected light into electric signal values representing an image of said phantom,
   (iv) subjecting the electric signal values representing an image of said phantom to on-line processing according to a test program using parameters that have been stored in advance so as to determine at least one characteristic value indicative of the performance of the read out system,
   (v) retrieving from a memory device limiting value(s) corresponding with said characteristic value(s),
   (vi) applying said signal values representing an image of said phantom, said limiting value(s) and said performance characteristic value(s) to a recorder to generate a hard copy image of said phantom and a representation of said characteristic value(s) in relation to said limiting value(s).

7. A method according to claim 6 wherein said test program is initiated upon reading a key referring to said test program, said key being stored into an identifier of the phosphor screen.

8. A method according to claim 7 wherein said key is written into an electronic memory device provided on a cassette conveying a phosphor screen and wherein said electronic memory device is read in the read out system.

* * * * *